US007206835B2

(12) United States Patent
Kusumoto et al.

(10) Patent No.: US 7,206,835 B2
(45) Date of Patent: Apr. 17, 2007

(54) USER OPERATION LOG RECORDING AND STORING APPARATUS USING OBJECT-ORIENTED TECHNOLOGY

(75) Inventors: Koji Kusumoto, San Jose, CA (US); Akiumi Ito, San Jose, CA (US); Kazushige Oikawa, San Jose, CA (US)

(73) Assignee: K-Plex Inc., San Jose, CA (US)

( * ) Notice: Subject to any disclaimer, the term of this patent is extended or adjusted under 35 U.S.C. 154(b) by 680 days.

(21) Appl. No.: 10/136,426

(22) Filed: May 2, 2002

(65) Prior Publication Data

US 2003/0051033 A1 Mar. 13, 2003

(30) Foreign Application Priority Data

May 2, 2001 (JP) ............................. 2001-135098

(51) Int. Cl.
*G06F 15/173* (2006.01)
*G06F 3/00* (2006.01)
(52) U.S. Cl. ..................... 709/224; 709/205; 719/329
(58) Field of Classification Search ........ 709/217–219, 709/223–225; 719/238–239
See application file for complete search history.

(56) References Cited

U.S. PATENT DOCUMENTS 6,714,992 B1 * 3/2004 Kanojia et al. ............. 719/321
6,845,396 B1 * 1/2005 Kanojia et al. ............. 709/224
6,895,437 B1 * 5/2005 Cowdrey et al. ........... 709/224
2004/0249938 A1 * 12/2004 Bunch ....................... 709/224

* cited by examiner

Primary Examiner—Krisna Lim
Assistant Examiner—Yasin Barqadle
(74) Attorney, Agent, or Firm—Birch, Stewart, Kolasch & Birch, LLP

(57) ABSTRACT

A user operation log storing apparatus for investigating operations performed by a user, types of data handled by the user and contents of processing conducted by the user, and for saving acquired information through the investigation. The present invention provides a group of objects (VOs) for a user to access the WWW, database, etc. and conduct communications and for a service provider to readily compare and analyze acquired data. The VOs respectively hold as a log file an attribute thereof, results of user actions and an attribute value of a slot via which the VOs exchange data. The log files are sent to the server on the network, where they are classified according to users and stored in a time-series manner. Using the saved log file, the present invention also provides an environment as a VO for analyzing and utilizing the user's operation log.

7 Claims, 3 Drawing Sheets

USER OPERATION LOG RECORDING AND STORING APPARATUS USING OBJECT-ORIENTED TECHNOLOGY

BACKGROUND OF THE INVENTION

The present invention relates to a technology for analyzing and saving an operation log of a computer user.

In order to learn computer user's interests, patterns, etc., it would be desirable to be able to monitor computer operations performed by the user via a mouse, a keyboard, etc. to find out what kind of data the user referred to, how the user processed the data, etc.

In electronic commerce, etc., it has been desired for the sake of effective marketing activities to determine client's or customer's interests, preferences and purchasing patterns, etc. Conventionally, a questionnaire has been used to collect information about service users' interests, preferences, purchasing patterns, etc. However, replies submitted to a questionnaire are not necessarily reliable because it is left to a user's discretion how to answer questions in a questionnaire and data obtained from a questionnaire inevitably reflects the way each question is asked in the questionnaire. Further, as it takes time to fill out a questionnaire, it is often the case that a lot of users simply do not submit replies.

Although there are numerous log analysis systems available, they cannot analyze operations arbitrarily performed by a user, his (her) behavioral patterns etc. because the systems operate based on an analytical mechanism prepared unilaterally by a service provider.

It has been possible to gather detailed information about accesses such as information as to which page of a Web site a user has accessed, by acquiring URL information issued on the Web by means of the user's Web browser and analyzing the thus acquired string of URLs. However, even though the aforementioned conventional system enables determination as to which page of a Web site was accessed, it is still not possible to ascertain which specific data in the page a user showed interest in, which data a user compared with which data, from what perspective a user compared the data, etc., nor is it possible to obtain a log of accesses to multiple different Web sites.

In the report "Management and Search of Media Object Utilizing Operation Log" printed in the journal "Information Media", 28–15 (published on Nov. 29, 1996) [A-15], Jiro Suzuki and Yuzuru Tanaka proposed a method for describing an event in the form of a single sentence comprising such elements as (Who, When, Where, What, How) in an operation log of an Intelligent Pad. "How" describes an event such as "pasting", "peeling", "clicking", etc. For example, when a user named Taro pasted a portion of data in a table on a chart to view the data, a single sentence "Taro, date, Chart, Table, Paste" is recorded in the log. According to this method, however, it is not possible to determine which portion of the table was pasted on the chart. Thus, such log information provided by conventional "How" is not sufficient for effective marketing activities.

An Intelligent Pad (IP) is an object-oriented software development and operating environment designed and developed by Professor Yuzuru Tanaka of School of Engineering at Hokkaido University, in which visual programming by linking objects to one another is viable. According to the IP, software is developed by synthesizing, disconnecting and reusing components called "pads" respectively consisting a model part and a view part and having a specific function. The developed software is also called a "pad" and is reusable for developing the other "pads". A "pad" is a type of an object which functions as a basic unit encapsulating its inherent data and methods (functions) and is able to exchange data and messages with another pad via a common interface called "slot". The details of IP are published in various literatures and the Intelligent Pad Consortium (Intelligent Pad Consortium, http://www.pads.or.jp/).

SUMMARY OF THE INVENTION

Therefore, it is an object of the present invention to solve the problems of a variety of conventional means mentioned above. It is a further object of the present invention to provide means for monitoring user's operations performed by means of a mouse, keyboard, etc. and saving data collected by monitoring in order to obtain information about the user's interests, preferences, patterns, etc. without inconveniencing the user, thereby securing thorough and reliable information for marketing activities.

The present invention provides a group of visual objects (hereinafter referred to as VOs) which can be readily utilized for a user to access the WWW (World Wide Web), databases, etc., to conduct communications and to compare and analyze data obtained by the user in his (her) client environment.

Each of the VOs holds, as a log file, its attributes, results of user's actions and attribute values of a slot via which VOs exchange data when they link with each other.

When users' client environments are connected to a server via a network, such log files are sent to the server in a timely manner from the respective VOs through the users' client environments and are classified according to users to be saved in the server in a time-series fashion. On the contrary, when the users' client environments are not connected to the server, the log files are temporarily saved in the respective client environments and sent to the server when the connection is established.

In one embodiment of the present invention, the above-described VO is implemented by using the aforementioned Intelligent Pad technology.

The VO of the present invention has a data storage means for storing XML data in its model part, so that the VO can save events including those of the model part of the IP as a log file and the saved log file can be output by means of message communication between VOs.

DETAILED DESCRIPTION OF THE INVENTION

Figure 1:
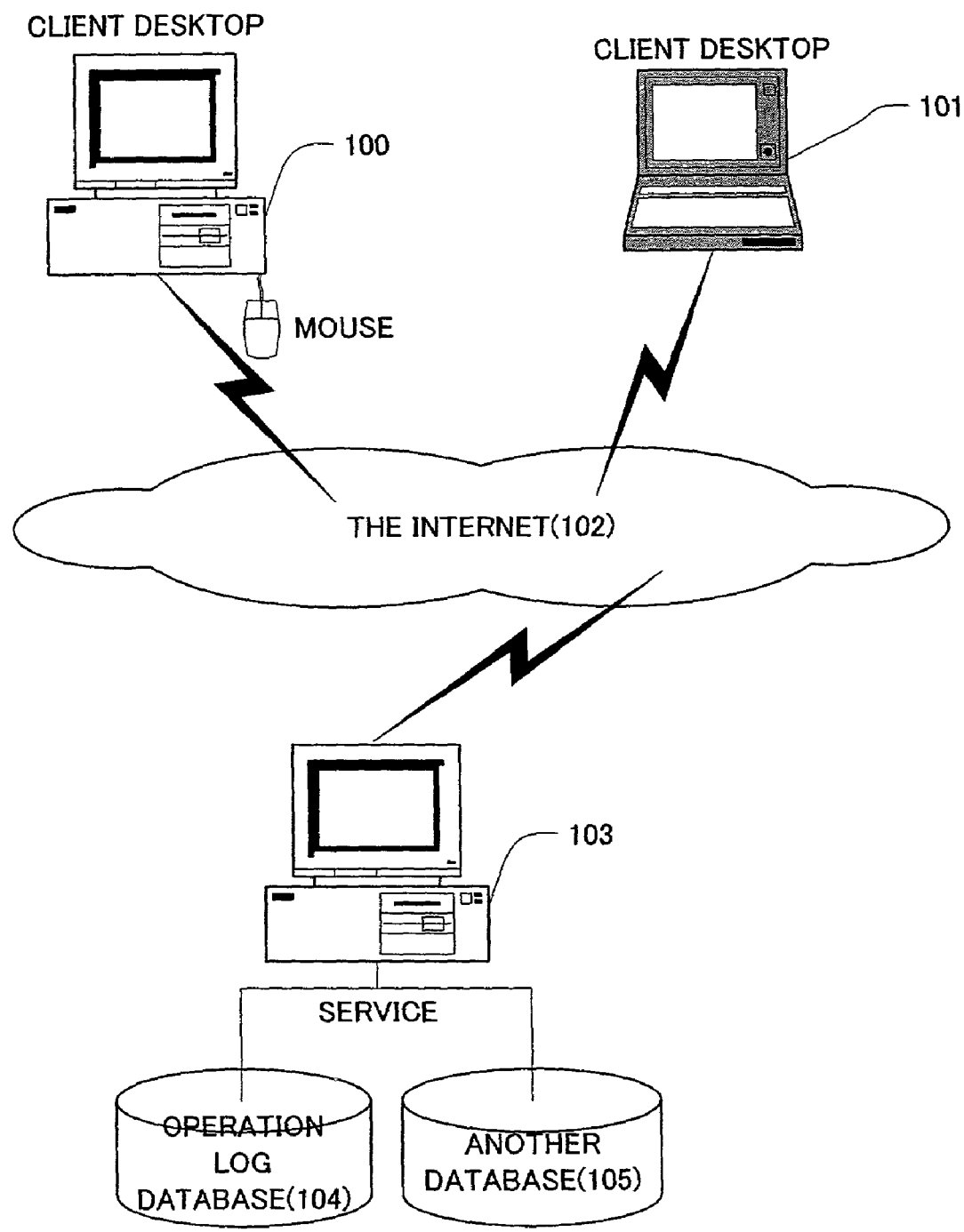
FIG. 1 is a schematic diagram illustrating a network environment in which the present invention is implemented.

FIG. 1 is a schematic diagram illustrating a network environment in which the present invention is implemented. In FIG. 1, computers 100 and 101, each having a client environment for the aforementioned VO to operate, communicate with a server 103 through an optional network 102, which may be the Internet. An environment of a client machine of each user is referred to as a "client desktop". A client desktop is also regarded as a type of VO and has a function of storing an operation log output from the VO in its memory, temporarily saving the log in a log file and sending the log file in a timely manner via the network 102 to service provided on the server 103. The service provided on the server 103 has a function of saving the operation log sent from the client desktop in an operation log database 104, searching, reading, displaying and deleting the saved operation log. Also, the server 103 may have another database 105 for providing other services.

In the invention disclosed in the patent application entitled "Method and Apparatus for Automatically Searching Hypertext Structure", Yoshihide Kotani, Tetsuya Yoshimura, Koji Kusumoto, Kazushige Oikawa, which was assigned to the same assignee as the present invention also, propose a means for recording a user's operation for accessing a Web site, at which the user has an account, to search a desired page and data/data group in the page and for automatically repeating the same operation as the operation performed by the user based on the recorded operation. If the aforementioned means is implemented by using a VO and the log saving technology of the present invention is applied to the VO, a record of user's accesses to the WWW can be automatically obtained.

Further, the invention disclosed in the patent application entitled "Data Processing Apparatus Based on Object Oriented System" by Koji Kusumoto, Kazushige Oikawa, which was assigned to the same assignee as the present patent application, sets forth a means for retrieving data in various formats such as CSV, HTML, XML or data in the form of a table of a database, converting the retrieved data into data in a common format and displaying the converted data in the form of a table or a list so that a user can arbitrarily extract, process and synthesize the data to display the data in the form of a chart or in the overlapped fashion. If the aforementioned means is implemented by using a VO and the log saving technology of the present invention is applied to the VO, a record of user's data processes concerning what retrieval formula the user employed to access the data in various formats, which portion of data the user extracted, what views the user overlapped for comparison, etc. can be automatically obtained.

Next, a function of saving a log of VO operations according to the present invention will be described.

Saving of Log

A VO of the present invention has a function for saving a log of operations directed to itself. The VO operates in a user's client environment. It is desirable that a log of operations directed to VOs such as a VO for a user to access the WWW, database, etc., a VO for a user to conduct communications, a VO that can be readily used for comparison and analysis of obtained data, etc. be saved. These VOs will be referred to as application VOs (AVO) below. An AVO function can be incorporated into any optional VO.

A log is output in an XML format from each AVO at appropriate times, and the aforementioned client desktop VO receives the logs and accumulates the same in memory of a client machine. In response to an instruction from the desktop VO, the accumulated logs are sent to the server on the network and accumulated in a log database in the server environment. In other words, a desktop VO of each client collects logs on its memory and controls output of the collected logs to the server.

A log has elements as shown in Table 1 and is output in an XML format.

TABLE 1

| Element | Definition |
|---|---|
| Entry | Log entry for each operation. Created per output. When a log is from an AVO, a value "App" is specified as "type". "time" indicates the time when a log was output from a particular AVO. |
| Item | Each AVO describes an operation type of log entry by a character string. |
| Subject | Indicates an AVO itself that output the log entry. |
| Object | Specifies a VO associated with the AVO. |
| Detail | Each AVO adds additional information to <Detail> element as needed. |

Log Storing Method

When an AVO operating on the desktop is requested to record a log of the application, the AVO acquires a log object from the desktop VO and writes the log to the log object.

Normally, a log is stored in a local memory and sent to the server in response to an instruction from the desktop VO. The log is transmitted immediately before the desktop is stored in the server or when a log storage instruction is issued to the desktop VO.

When closing a desktop in a situation where a log cannot be written to the server due to unexpected disconnection from the network or the like, log information on the memory is stored together with an urgent save file of the desktop VO. Then, the stored log information is read into the desktop at the same time as the urgent save file is loaded next time.

An AVO intending to write a log can instruct a log object to start writing a log at an optional time, in which case all logs, including application logs written by other VOs, are simultaneously written.

Next, an example of an application of the log function according to the present invention will be described below.

For example, when stock price movement data of multiple companies obtained from a stock price database is read and data about one of the companies chosen by a user is displayed in the form of a table and a part of the table is selected and compared with a corresponding part of data about the other companies also displayed in the form of a table, an operation log indicating "what portion of data about which company was referred to" is considered to be particularly useful among operation logs to be saved. This is a typical example of logs that can provide valuable information for marketers to conduct the user's performance of product/service comparison, etc.

Figure 2:
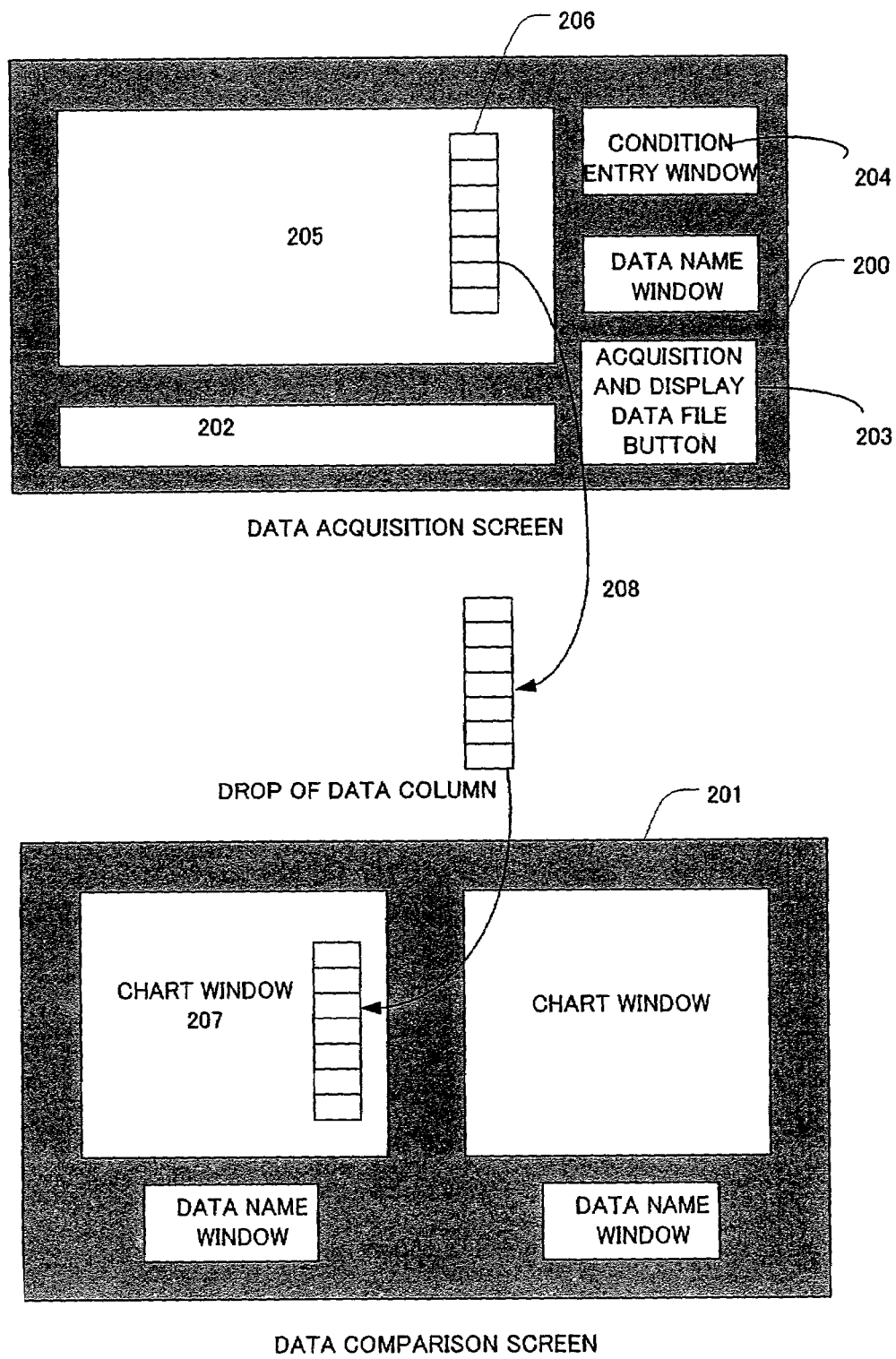
FIGS. 2 and 3 are schematic diagrams each illustrating the image of an operation screen of an apparatus according to the present invention.

FIG. 2 is a schematic diagram illustrating an image of a user's operation screen. The drawing shows a data acquisition screen 200 and a data comparison screen 201.

On the data acquisition screen 200 a user performs the following series of operations.

(1) A user specifies a data file using a window 202 where a data file is selected. (2) The user clicks on a data file acquisition/display button 203, thereby acquiring the specified data file. (3) The user displays the acquired data file on a display window 205. (4) Next, the user enters a keyword representing a company of his (her) interest in a condition entry window 204 and reads a data portion associated with the company from the acquired data file. (5) The user clicks on the button 203 to display the data of the company.

Figure 3:
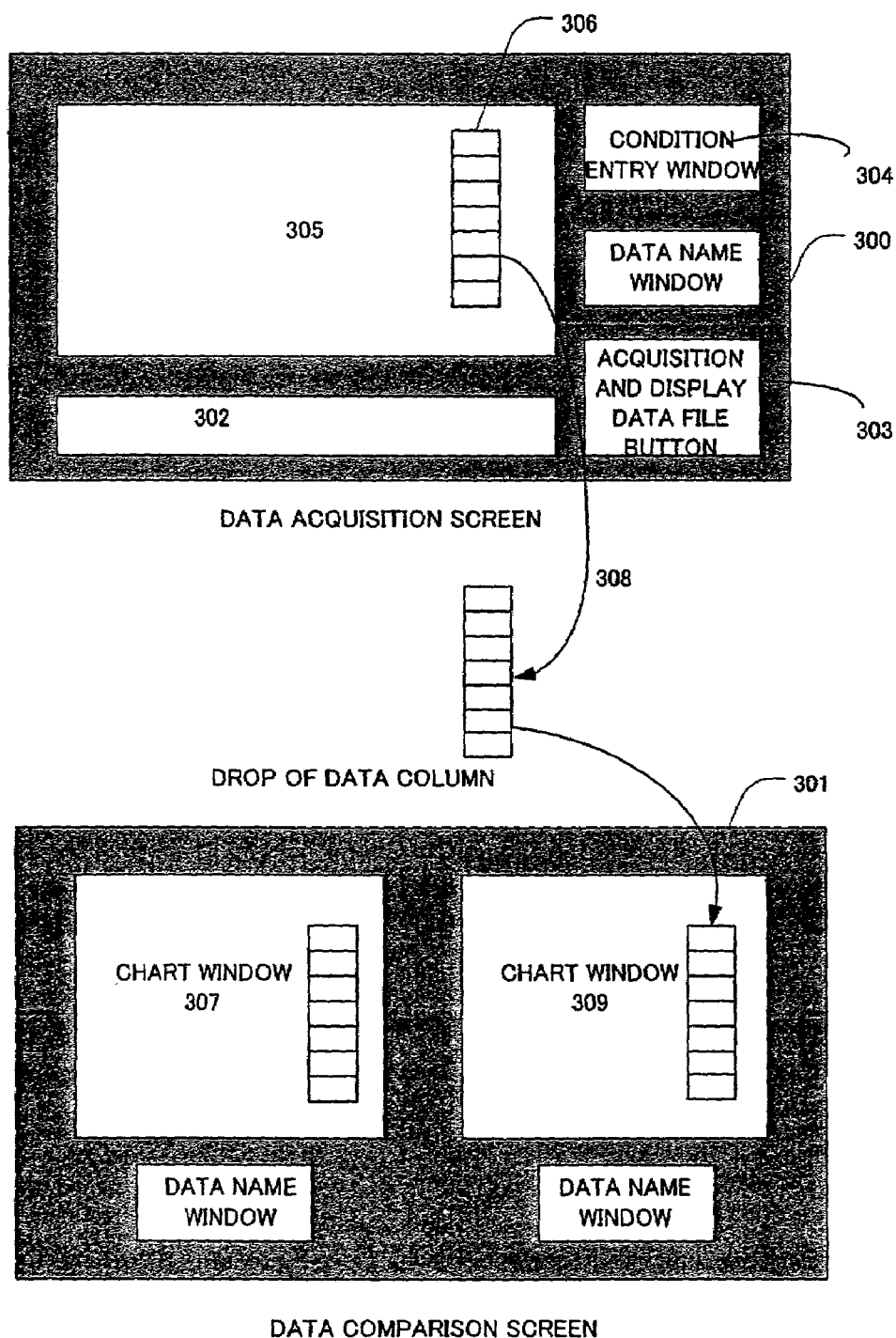

Next, operations performed on the data comparison screen 201 will be described with reference to FIGS. 2 and 3. FIG. 3 is identical in configuration to FIG. 2, wherein referential numerals sharing the same units digit denote the same component. The operations on the data acquisition screen are similar to the above (1) through (5). Referring to FIGS. 2 and 3, operations to be performed following (5) will be described below. (6) The user selects the first item as an object of comparison (column 206 in this case) from the data displayed on the display window 205 of the data acquisition screen 200. (7) The user drags (208) the selected column to a chart window 207 on the data comparison screen 201 and drops the column on the chart window 207. (8) Further, the user selects the second item as an object of comparison (column 306 in this case) from the data displayed on a display window 305 of a data acquisition screen 300. (9) The user drags (308) the selected column to the other chart window 309 on a display screen 301 and drops the column on the chart window 309. Thus, the charts of data as objects of comparison are displayed on the chart windows 307 and 309.

Following is a portion of a log as a record of the foregoing operations.

```
<Logs>
    <Entry type="App" time="20010401181400">
        <Item>VO Pasted</Item>
        <Subject void="31378C33-EB97-11D4-913E-
00E0291F40CD" class="BasicChartVO" name="Basic Chart"/>
        <Object void=" C79E94C7-1AE6-4D4E-AF88-
6B1C87EE9C10" class="TableVO" name="Table"/>
        <Detail>
        <Url>http://www.financefinance.com/</Url>
<VOSet xmlns:vok="urn:schemas-kplex-com:vok">
<Pad><VOName name="BasicChart" />
<Connection primarySlot="Data" />
<Model>
<Variable name="ValueCaption">Close</Variable>
<Variable name="LabelCaption">Date</Variable>
</Model>
<Pad>
<VOName name="Table" />
<Connection primarySlot="Data" peerPad="0" peerSlot="Data"
/>
<AutoConnect peerVOName="BasicChart" peerSlot="Data" />
<Model>
<Variable name="rootpath">//table[caption="AAA"]</Variable>
<Variable name="caption">AAA</Variable>
</Model>
</Pad>
</Pad>
</VOSet>
</Detail>
</Entry>
    <Entry type="App" time="20010401182300">
        <Item>Important operation</Item>
        <Subject void="..." class="..." name="..."/>
        <Detail>
        ...
        </Detail>
    </Entry>
</Logs>
```

The above is a log of operations for pasting a column VO constituting a portion of a table, on a chart VO. In the above log, "App" and "pm 18:14, Apr. 1, 2001" are described as an entry type and time respectively. <Item>VO Pasted</Item> indicates a record that pasting of a VO and delivery of some data occurred. In the log obtained above, "Subject" indicates Chart and "Object" indicates Table and "Detail" is a record of how to connect data pre-defined by Table and Chart. From <VOName name="Table"/><Connection primarySlot="Data" peerPad="0" peerSlot="Data"/> and <AutoConnect peerVOName="BasicChart" peerslot="Data"/>, it is to be understood that the data structure of a portion displayed in the form of Table has been converted to a model data structure of Chart. Further, a slot name and a slot value, which are both significant as a log, are also described in the log.

In the Table part, the slot "rootpath" corresponds to a search expression. The slot "caption" is a "keyword representing a company name." In the Chart part, the slot "ValueCaption" is a "data column caption," and the slot "LabelCaption" is a "data row caption." It can be found from the foregoing information, for example, what movement of the stock price of which company is passed on to the chart and displayed in the form of a graph.

It is to be understood that the foregoing description of the embodiment is a mere example and the embodiment is not restrictive of the invention as claimed. It is obvious to those skilled in the art that a variety of modifications can be made without departing from the spirit and scope of the present invention. For example, while it is assumed in the foregoing embodiment that the data held in the data storage is in XML format, the data format is not limited to this particular one and the data may be in any other format, for example, CSV format. Also, information processing performed by a user is not limited to accesses to the WWW, databases and so on, and other communications, comparison, analysis and etc. of acquired data and a variety of applications can be made. It should be apparent that such processing also falls under the scope of the present invention.

According to the present invention, it is possible to save in the form of an operation log, information not only about which WWW site was accessed, which data in the WWW site was referred to but also which data were compared with each other.

Also, by saving operation logs in a time-series manner, user operations performed with respect to transition of the visited WWW sites, accessed data transition, transition of comparison methods, etc. can be analyzed precisely. Thus, the present invention makes it possible for a service provider to conduct efficient and effective marketing activities based on reliable information about users' operation runs.

According to the present invention, a service provider can acquire information without forcing users to input new information and utilize the acquired information for the purpose of improvement of their service to the users, etc.

In other words, by acquiring highly reliable data of users' actions and closely analyzing the data, the present invention can provide a system capable of rapidly giving precise feedback to users.

What is claimed is:

1. A user operation log saving apparatus using object oriented technology, comprising:
    a plurality of first objects each having a model part, a view part and one or more slots, for processing information in response to said user operation directly applied to said first object via a user interface; and
    a second object having a model part, a view part and one or more slots, for operating as a desktop environment in which said first objects operate,
    wherein
        said slots exchange data among said plurality of first objects and said second object,
        said model part has a data storage part for holding data to be exchanged, and
        said data storage part of said first object stores as a log file, the following:
            an attribute and corresponding attribute value of said first object,
            results of user operations, and contents of said model part including attribute values of a slot through which said first object exchanges data with another object when said first object is linked with said another object.

2. An apparatus according to claim 1, wherein said log file held in said data storage part of said first object is in XML format.

3. An apparatus according to claim 1, wherein said information processing performed in response to said user operation applied to said first object includes at least one of an access to WWW, an access to database, other communications and comparison and analysis of acquired data by using said first object.

4. An apparatus according to claim 1, wherein said log file is sent to a server on a network in a timely manner under control of said second object that works as a desktop environment, so that the log files are classified according to users and saved in said server in chronological order.

5. An apparatus according to claim 2, wherein when a log file cannot be sent to the server, the second object that works as a desktop environment holds the log file as an urgently saved file and attempts to re-send it when connection to the server is restored.

6. A program for implementing a user operation log saving function using object oriented technology, said program, when executed on a computer, causing the computer to provide:
   a plurality of objects each having a model part, a view part and one or more slots, for processing information in response to said user operation directly applied to said first object via a user interface; and
   a second object having a model part, a view part and one or more slots, for operating as a desktop environment in which said first objects operate,
   wherein
      said slots exchange data among said plurality of first objects and said second object,
      said model part has a data storage part for holding data to be exchanged, and
      said data storage part of said first object stores, as a log file, the following:
         an attribute and corresponding attribute value of said first object,
         results of user operations and
         contents of said model part including attribute values of a slot through which said first object exchanges data with another object when said first object is linked with said another object.

7. A computer readable medium having recorded thereon a program for implementing a user operation log saving function using object oriented technology, said program, when executed on a computer, causing the computer to provide:
   a plurality of first objects each having a model part, a view part and one or more slots, for processing information in response to said user operation directly applied to said first object via a user interface; and
   a second object having a model part, a view part and one or more slots, for operating as a desktop environment in which said first objects operate,
   wherein
      said slots exchange data among said plurality of first objects and said second object,
      said model part having a data storage part for holding data to be exchanged, and
      said data storage part of said first object stores, as a log file, the following:
         an attribute and corresponding attribute value of said first object,
         results of user operations actions, and
         contents of said model part including attribute values of a slot through which said first object exchanges data with another object when said first object is linked with said another object.

* * * * *